(12) United States Patent
Clark et al.

(10) Patent No.: US 8,707,171 B2
(45) Date of Patent: Apr. 22, 2014

(54) SERVICE REGISTRY POLICY EDITING USER INTERFACE

(75) Inventors: Duncan G. Clark, Yateley (GB); Steven Groeger, Poole (GB); Evan G. Jardine-Skinner, Southampton (GB); Samuel J. Smith, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/388,900

(22) PCT Filed: Jul. 27, 2010

(86) PCT No.: PCT/EP2010/060836
§ 371 (c)(1),
(2), (4) Date: Feb. 3, 2012

(87) PCT Pub. No.: WO2011/015488
PCT Pub. Date: Feb. 10, 2011

(65) Prior Publication Data
US 2012/0144295 A1    Jun. 7, 2012

(30) Foreign Application Priority Data
Aug. 4, 2009   (EP) .................................... 09167208

(51) Int. Cl.
*G06F 17/00* (2006.01)
(52) U.S. Cl.
USPC ........................................................ 715/255
(58) Field of Classification Search
USPC ........................................................ 715/255
See application file for complete search history.

(56) References Cited

U.S. PATENT DOCUMENTS

| | | | |
|---|---|---|---|
| 2004/0193459 A1* | 9/2004 | Delaney et al. | 705/7 |
| 2005/0086197 A1* | 4/2005 | Boubez et al. | 707/1 |
| 2008/0065466 A1 | 3/2008 | Liu et al. | |

OTHER PUBLICATIONS

European Patent Office, International Search Report for PCT Application No. PCT/EP2010/060836, Nov. 11, 2010, pp. 1-5, Rijswijk, The Netherlands.
Tan Phan, et al., Quality-Driven Business Policy Specification and Refinement for Service-Oriented Systems, Proceedings of the International Conference on Service Oriented Computing ICSOC 2008, Dec. 1, 2008, pp. 5-21, Springer Berlin Heidelberg, Berlin, Germany.
Paul A. Buhler, et al., Experiences Building a Standards-Based Service Description Repository, Proceedings of the 10th IEEE Conference on E-Commerce Technology, Jul. 21, 2008, pp. 343-346, IEEE, Piscataway, NJ, USA.
Kris Verlaenen, et al., Towards simplified specification of policies in different domains, Proceedings of 10th IFIP/IEEE International Symposium on Integrated Network Management, May 1, 2007, pp. 20-29, IEEE, New York, NY, USA.
Heiko Ludwig, et al., Cremona: an architecture and library for creation and monitoring of WS-agreents, Proceedings of the 2nd International Conference on Service Oriented Computing, Nov. 2004, pp. 65-74, Association for Computing Machinery, New York, NY, USA.
Haiqu Liang, et al., A Policy Framework for Collaborative Web Service Customization, Proceedings of the 2nd IEEE International Workshop on Service-Oriented System Engineering, Oct. 2006, pp. 197-204, IEEE, New York, NY, USA.

* cited by examiner

*Primary Examiner* — Doug Hutton, Jr.
*Assistant Examiner* — Andrew McIntosh
(74) *Attorney, Agent, or Firm* — Lee Law, PLLC; Christopher B. Lee

(57) ABSTRACT

A selection of a service domain policy definition is received in a service repository. A service policy document is created from the service domain policy definition. At least one user change to the service policy document is received in accordance with the selected service domain policy definition. The service policy document is saved in the service repository.

21 Claims, 10 Drawing Sheets

| SERVICE REGISTRY AND REPOSITORY |
|---|
| EDIT POLICY DOCUMENT (MAIN PANEL) |
| POLICY DOCUMENT NAME = "AAA.XML" VERSION = "" |
| MULTIPLE SUPPORTING TOKEN POLICY<br>  \| CHANGE POLICY TYPE \| ADD ASSERTION \| ADD WS-POLICY ELEMENT |
| SIGNED SUPPORTING TOKENS<br>  \| DELETE |
| SUPPORTING TOKENS POLICY<br>  \| ADD ASSERTION \| ADD WS-POLICY ELEMENT |
| SIGNED ENCRYPTED TOKENS<br>  \| DELETE |
| SUPPORTING TOKENS POLICY<br>  \| ADD ASSERTION \| ADD WS-POLICY ELEMENT |
| ALGORITHM SUITE<br>  \| DELETE |
| DETAILS |
| POLICY DOCUMENT<br>NAME: "AAA.XML"<br>VERSION:<br>DESCRIPTION: |

Figure 7

SERVICE REGISTRY POLICY EDITING USER INTERFACE

RELATED APPLICATIONS

This application is a National Stage application of, claims priority to, and claims the benefit of International Application Serial No. PCT/EP2010/060836, titled "SERVICE REGISTRY POLICY EDITING USER INTERFACE," filed Jul. 27, 2010, in the European Patent Cooperation Treaty Receiving Office, which further claims priority to, and claims the benefit of European Patent Application Serial No. 09167208.9, titled "SERVICE REGISTRY POLICY EDITING USER INTERFACE," filed Aug. 4, 2009, in the European Patent Office, the entire contents of each application are hereby incorporated by reference as if fully set forth herein.

BACKGROUND

This invention relates to a service registry and repository. In particular this invention relates to a service registry and repository based on a triplestore database for a policy editing user interface.

Service oriented architecture (SOA) is a business-driven IT architectural approach that supports integrating a business as linked, repeatable business tasks, or services. The basic building block is a service document that defines a service so that it can be managed with other services. A service document contains information about a service, including the location of the service and details about the service, and how to access the service. Service documents are used by analysts, architects, and developers during a Development Phase of the SOA life cycle to locate services to reuse and to evaluate the impact of changes to service configurations. Service documents are variously described as metadata, objects, descriptions, entities and artefacts.

A service repository stores the service document and allows access to the service document, and thereby the corresponding service. A service registry is an index of a subset of information about a service (for example the location and name of service document) enabling the corresponding service document to be located and accessed in a repository (or even the corresponding service located at the service provider). An integrated service registry and repository allows a service operation to use both the indexed service information in the registry and the detailed service information in the repository. An example of an integrated service registry and repository is IBM® WebSphere® Registry and Repository (WSRR).

Such an integrated service registry and repository has advantages of greater business agility and resilience through reuse than separate systems. Further advantages of looser coupling, greater flexibility, better interoperability, and better governance arise from the integration. These advantages are addressed by separating service descriptions from their implementations, and using the service descriptions across the life cycle of the service. Standards-based service metadata artefacts, such as Web Service Definition Language (WSDL), extensible mark-up language (XML) schema, policy or Service Component Architecture (SCA) documents, capture the technical details of what a service can do, how it can be invoked, or what it expects other services to do. Semantic annotations and other metadata may be associated with these artefacts to offer insight to potential users of the service on how and when it may be used, and what purposes it serves.

WS-Policy is a World Wide Web Consortium (W3C) standard that specifies policy documents for web services. A WS-Policy document that conforms to the W3C standard declares policies (top level elements), assertions (rules that must be adhered to) inside those policies, and properties for these assertions (for example an assertion may be declared to be optional within a policy). Standard types of policy document (also covered by the W3C) called domain policy definitions include: security (WS-Security); reliable messaging (WS-RM); addressing (WS-A). Each of these domain policy definitions describes the required structure for the policy XML files in order to conform to the standard.

An example of a domain policy definition is an XML document defining what type of authentication tokens must be supplied when accessing a web service. WS-Policy-Attach domain policy definition specifies a standard approach by which policy attachments may be defined. In the context of a service registry environment, this becomes particularly relevant as the service registry exists as a point-of-record for web services definitions and thus it is desirable to make these associations between policies and their subjects within the registry.

Standard tools create WS-Policy and WS-Policy-Attach policy documents, and even a text editor may be used for this purpose if the user is well versed in the various WS-Policy specifications. However, the structure of both the policy and the policy attachment specifications requires a high level of knowledge from the users in order to correctly specify everything. Most often errors are made by a user when creating policy documents.

BRIEF SUMMARY

A method for operating a service registry and repository based on a triplestore database, includes receiving a selection of a service domain policy definition in the service repository; creating a service policy document from the service domain policy definition; receiving at least one user change to the service policy document in accordance with the selected service domain policy definition; and saving the service policy document in the service repository.

A service registry and repository system based on a triplestore database includes at least one processor programmed to receive a selection of a service domain policy definition in the service repository; create a service policy document from the service domain policy definition; receive at least one user change to the service policy document in accordance with the selected service domain policy definition; and save the service policy document in the service repository.

A computer program product includes a computer readable recording medium having computer readable code stored thereon for a service registry and repository based on a triplestore database, where the computer readable code when executed on a computer causes the computer to receive a selection of a service domain policy definition in the service repository; create a service policy document from the service domain policy definition; receive at least one user change to the service policy document in accordance with the selected service domain policy definition; and save the service policy document in the service repository.

According to one aspect of the present subject matter there is provided a service registry and repository triplestore method as described in claim 1.

The present subject matter proposes model-based user-interface editing capabilities that are used within distributed systems to help users create policy documents (for instance WS-Policy files and WS-Policy-Attach files) that are relevant within their service registry environment.

The present subject matter uses software modelling techniques in order to provide a generic framework that may support a user-interface for editing WS-Policy documents from any domain. The user-interface may take advantage of this modelling in order to impose constraints on user actions, which allows valid WS-Policy files to be generated that conform to the domain specification.

A triplestore database may be used to store data in a data structure comprising three pieces of information in the form subject-predicate-object. The purpose of triplestore is to increase performance in searching for information in a large volume of complex data and as such is well suited to the application of a service registry and repository where the number and complexity of the data is large.

BRIEF DESCRIPTION OF THE SEVERAL VIEWS OF THE DRAWINGS

Embodiments of the invention will now be described, by means of example only, with reference to the accompanying drawings in which:

FIG. 7 is an example of an implementation of a WebSphere Service Registry and Repository screenshot according to an embodiment of the present subject matter;

DETAILED DESCRIPTION

The subject matter described herein provides a service registry and repository for service documents based on IBM® WebSphere® Service Registry and Repository. Such service documents include traditional internet services that use a range of protocols and are implemented according to a variety of programming models.

Figure 1:
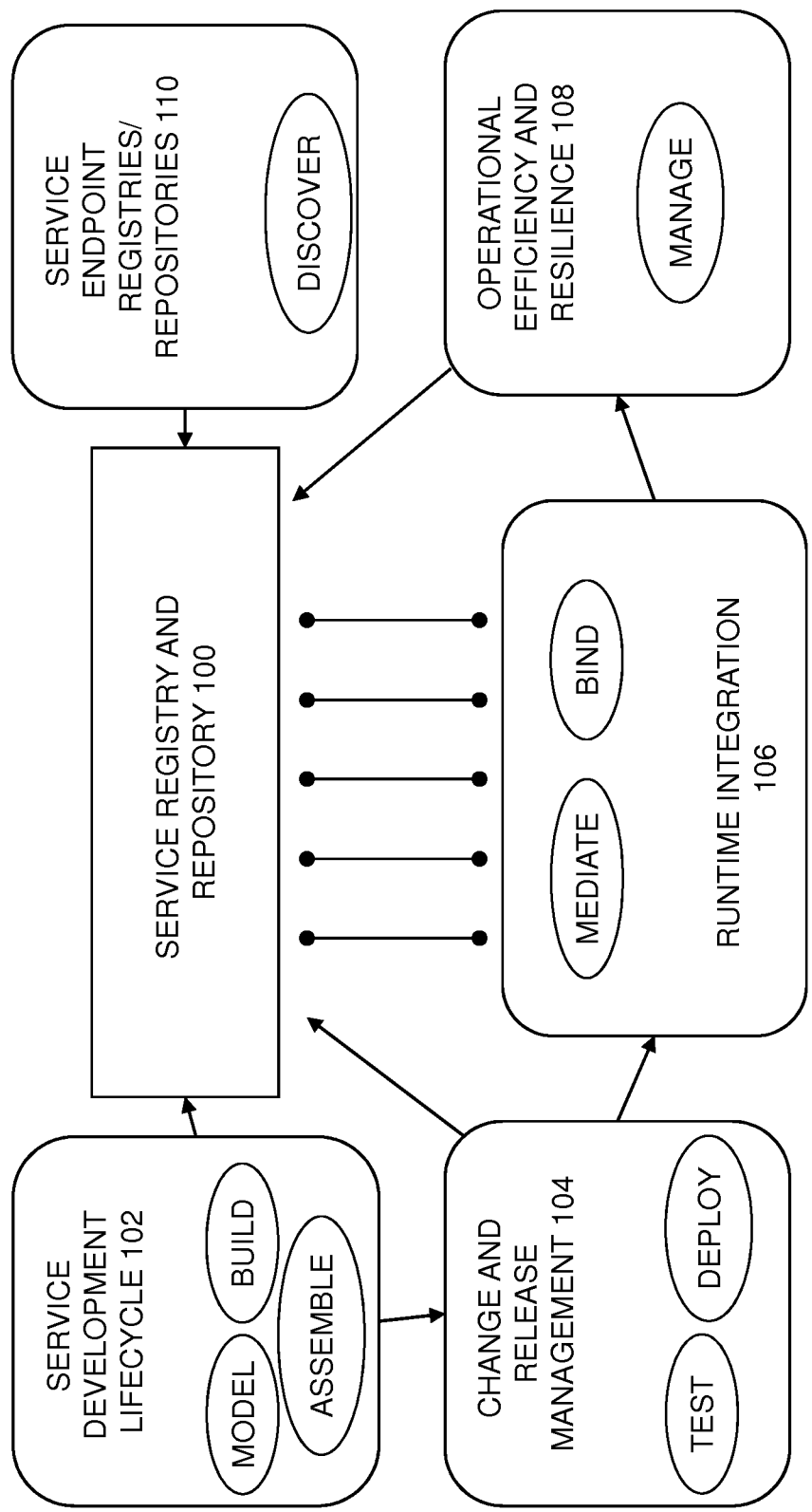
FIG. 1 is a schematic of an example of an implementation of service document phases in a service registry and repository according to an embodiment of the present subject matter.

FIG. 1 is a schematic of an example of an implementation of service life cycle phases of the services stored as documents in a service registry and repository 100 comprising: Service Development 102; Change and Release Management 104; and Runtime Integration 106 and Operational Efficiency and Resilience 108. As the integration point for service metadata, the service registry and repository 100 establishes a central point for finding and managing service metadata acquired from a number of sources, including service application deployments and other service metadata and endpoint registries and repositories 110. The service registry and repository 100 is where service metadata that is scattered across an enterprise is brought together to provide a single, comprehensive description of a service. Once this happens, visibility is controlled, versions are managed, proposed changes are analyzed and communicated, usage is monitored, and other parts of the service architecture may access service metadata with the confidence that they have found the copy of record.

Software Architecture

Figure 2:
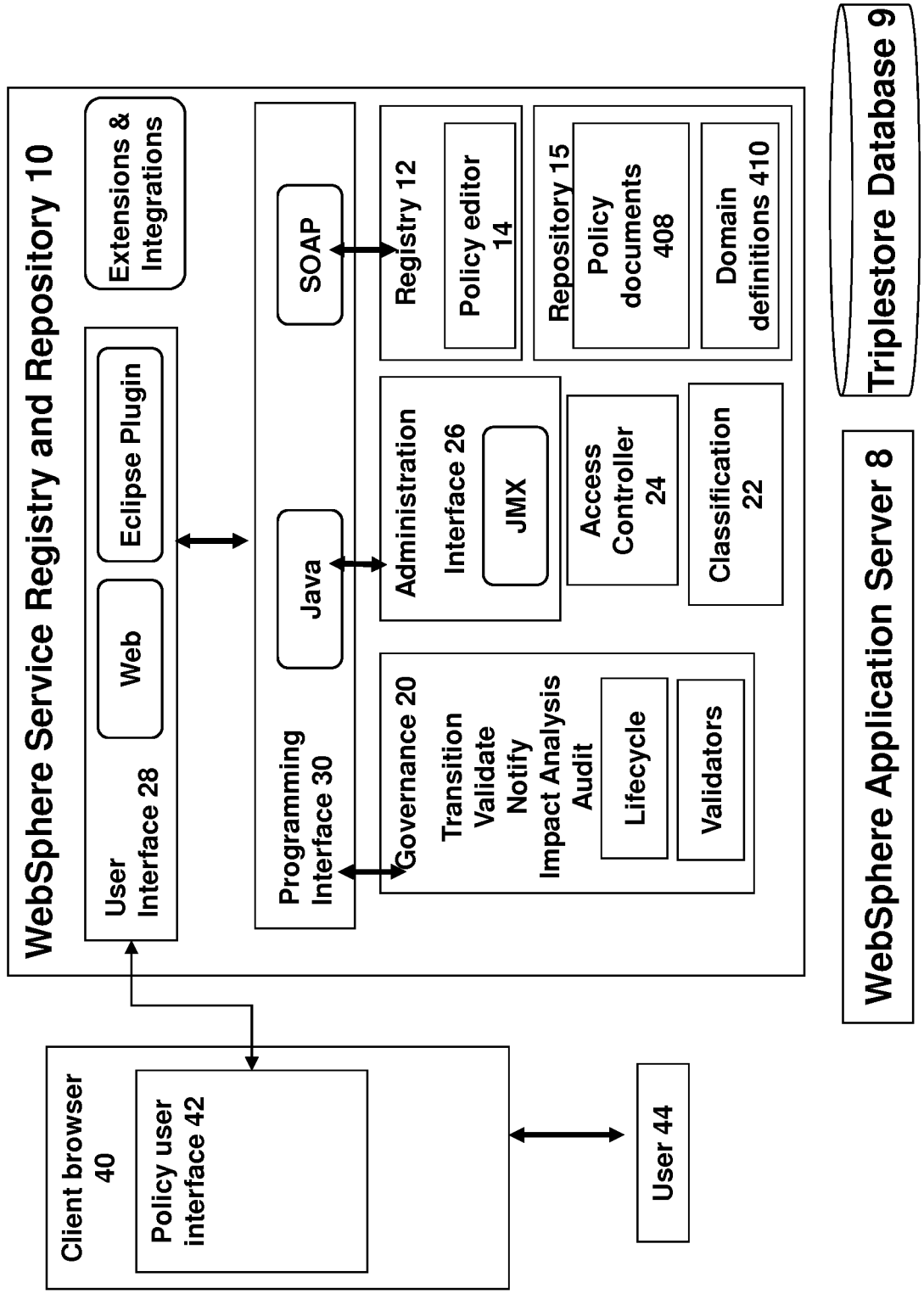
FIG. 2 is a schematic of an example of an implementation of an architecture according to an embodiment of the present subject matter.

FIG. 2 is a block diagram of an example of an implementation of an architecture. A service registry and repository 10 (alternatively referred to as WSSR 10 below) of the preferred embodiment is a Java™ 2 Platform Enterprise Edition (J2EE) application that runs on a WebSphere® Application Server 8 and uses a triplestore database 9 as a backing store to persist the service metadata. The service registry and repository 10 takes advantage of the role-based access control so that role-based views and access control may be turned on when the service registry and repository 10 is deployed as an enterprise-wide application. Referring to FIG. 2, top level components of the service registry and repository 10 comprise: a registry 12; repository 15; a governor 20; an administration interface 26; a user interface 28; and a programming interface 30.

The registry 12 offers both a registry function and a repository function for service metadata. The repository function allows users to store, manage, and query service metadata artefacts holding service descriptions. It not only takes good care of the documents containing service metadata by reliable persistence of the data, but it also provides a fine-grained representation of the content of those documents (for example, ports and portTypes in some service documents). The registry function provides for decorating registered service declarations and elements of the derived content models with user-defined properties, relationships, and classifiers. The registry 12 provides a policy editor 14. A client browser 40 displays a policy 42 for editing by a user 44.

The repository 15 stores all artefacts including policy documents 408 and domain policy definitions 410.

A classification component 22 allows service descriptions and parts of service definitions to be annotated with corporate vocabulary and to capture the governance state. Service classification systems are captured in web ontology language (OWL) documents that are loaded into the Service Registry and Repository 10 using the administration interface 26. Service registry and repository entities may be classified with values from these classification systems to allow classification-based queries to be performed and to allow access restrictions based on classification.

An access controller 24 supports a fine-grained access control model that allows for the definition of which user roles may perform specific types of actions on corresponding artefacts. Visibility of services may be restricted by business area and user roles may be restricted from transitioning services to certain life cycle states. This is in addition to the role-based access control provided by the service registry and repository 10.

The administration interface 26 supports the import and export of repository content for exchange with other repositories and provides an application programming interface (API) for configuration and basic administration. These support interactions with the Access Controller 24 and with the classification component 22.

The user interface 28 comprises a web interface and an Eclipse® plug-in interface to enable interaction with the service registry and repository 10. A servlet based web user interface (UI) may be the main way for users representing different roles to interact with the service registry and repository 10. The web interface supports all user roles, offering lookup, browse, retrieve, publish, and annotate capabilities, as well as governance activities, such as import/export and impact analysis. A subset of this user interface is offered as an Eclipse® plug-in to meet developer needs and analyst users needs that use Eclipse® based-tooling. The Eclipse® plug-in is used primarily for lookup, browse, retrieve, and publish capabilities. The Web-based user interface may also be used for performing service metadata management and governance.

The programming interface 30 uses Java and SOAP (Service Oriented Architecture Protocol) APIs to interact programmatically with registry and repository core 12. These APIs provide basic create, retrieve, update, and delete (CRUD) operations, governance operations, and a flexible query capability. The SOAP API is used to communicate content using XML data structures. The Java™ API is used to communicate content using service data object (SDO) graphs. Using either the user interface 28 or the programming interface 30, documents and concepts managed by WSRR may be created, retrieved, updated, and deleted. However, logical entities in the logical model cannot be modified and these may only be changed by updating a document that contains the logical entity. Concepts may be created, retrieved, and deleted.

The service registry and repository 10 supports two application programming interfaces (APIs) that may be used to interact with the registry 12; the repository 15; the governance component 20, and the administration interface 26: the Java-based API and the SOAP-based API, respectively. Both APIs support publishing (creating and updating) service metadata artefacts and metadata associated with those artefacts, retrieving service metadata artefacts, deleting metadata, and querying the content of the registry and repository. The programming APIs use Service Data Objects (SDO) to capture the data graphs inherent in the content model, allowing access to physical documents, logical parts of the physical documents, and concepts. The SOAP API uses XML documents to similarly represent Service Data Objects to communicate content structures in both the physical and logical model.

Information Architecture

Figure 3:
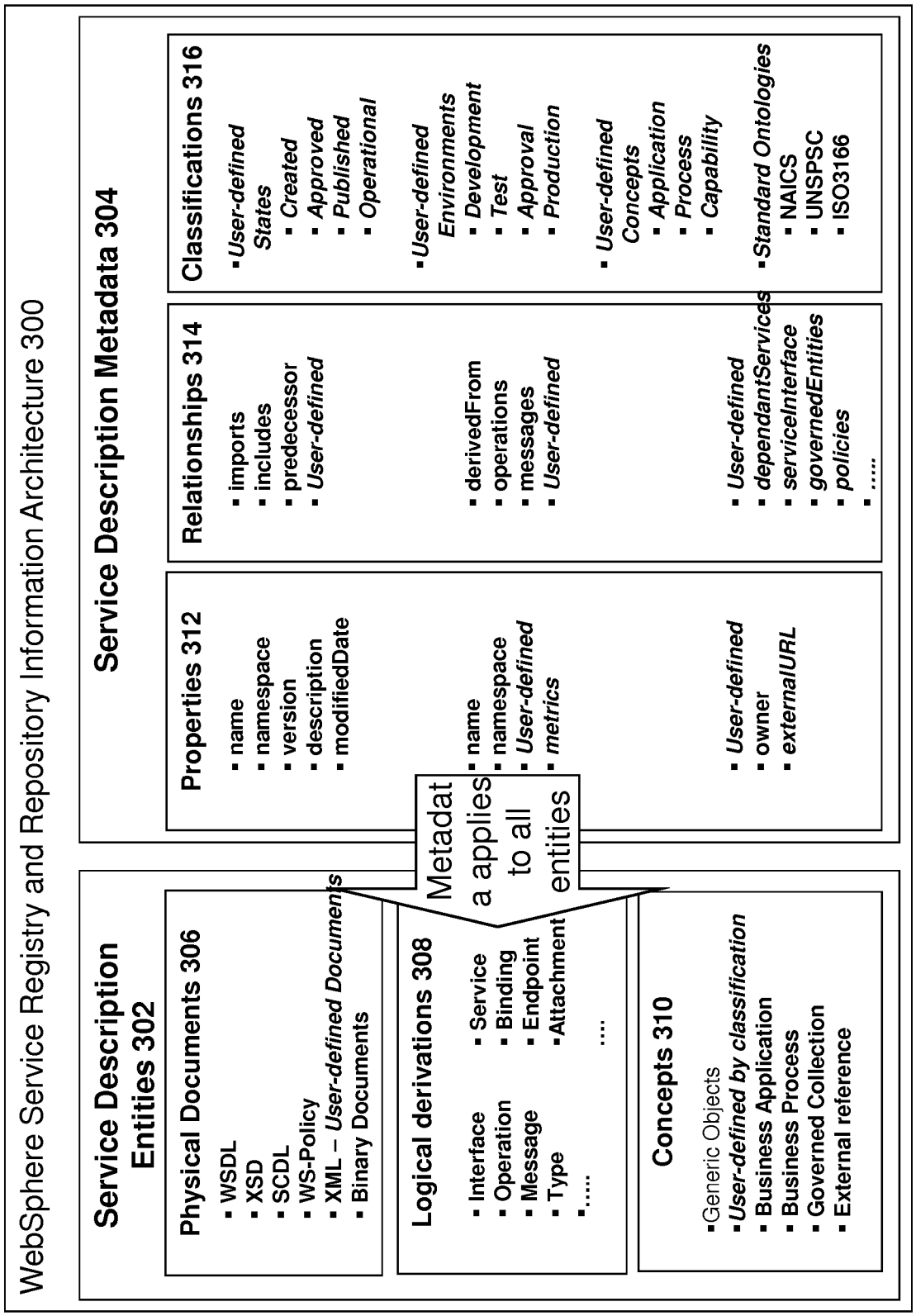
FIG. 3 is a schematic of an example of an implementation of an information architecture according to an embodiment of the present subject matter.

Referring to FIG. 3, FIG. 3 is a schematic of an example of an implementation of an information architecture 300 of the present subject matter. The information architecture 300 has entities representing service description entities 302 and service description metadata 304. All artefacts have an assigned URI, a name, and a description. Examples of each type of artefact are shown in FIG. 3, but are not necessarily referred to in the description.

The Service Description Entities 302 comprises physical documents 306; logical derivations 308, and concepts 310. The Physical Documents 306 are XML documents that are known as service metadata artefacts. The Logical derivations 308 are the finer-grained pieces of content that result when some types of physical document are shredded as they are loaded into the Registry and Repository. The Concepts 310 are generic entities that are usually typed, and represent anything that is not represented by a document in Registry and Repository 10. All three types of service description entities may be used in queries, have service annotations applied, and have relationships established from and to them.

The most elemental building blocks for the WSRR 10 are the physical documents 306 such as XSD, WSDL, SCDL or WS-Policy documents. In addition, any XML service metadata artefact type or binary document may be stored in the WSRR 10 and receive the benefits of broader visibility, reuse, management, and governance. The coarse-grained model made up from registry objects that represents those documents is referred to as the physical model. Documents are versionable objects in the WSRR content model, which means that in addition to a URI, name, and description, they also have a version property.

For some of the physical document types, WSRR 10 derives logical objects and stores them in logical derivations 308. For instance, the WSRR 10 may "shred" a document upon receipt into a set of logical objects to enable users to explore WSRR content beyond the boundaries of the files stored. Logical objects are not versionable. For some physical document types, the WSRR 10 defines predefined properties and detects relationships to other physical documents. An XSD document, for example, has a target Namespace property and relationships with other imported XSD documents, other redefined XSD documents, and other included XSD documents. When an entry for a certain physical document is created in the WSRR 10, it is inspected for relationships to other artefacts. If not already represented in the WSRR 10, a related artefact is also added, and in either case the relationship between the artefacts is recorded.

The set of logical derivations comprises the logical model of the WSRR 10. The logical model has entities such as portType, port, and message related to WSDL files, and complexType or simpleType related to XSD documents. Elements of the logical model have properties and relationships reflecting a subset of their characteristics as defined in the underlying document. For example, a WSDLService element has a namespace property and a relationship to the ports it contains. It should be noted that all individual results of document shredding are aggregated into one logical model that represents not only the content of individual documents, but also relationships between content in different documents.

The WSRR 10 stores other types of service metadata using the XML Document, a generic document type. Documents of type XMLDocument are not decomposed into the logical model.

The WSRR 10 uses a concept to represent anything that does not have a physical document. The concepts 310 are used to represent a reference to content in some other metadata repository, such as a portlet in a portlet catalogue or an asset in an asset repository. It may also be used to group physical artefacts together to govern them as a unit; for example, concepts may be versioned.

In addition to content directly related to entities 302, the WSRR 10 supports a number of metadata types that are used to describe entities 302. These metadata types are referred to as service description metadata 304. The WSRR 10 supports three types of service semantic metadata types: properties 312; relationships 314; and classifications 316. All three types describe physical model entities, logical model entities, and/or concepts. For example, service description metadata may be used to associate a property "businessValue" with a physical model entity representing a WSDL file. It might also be used to define a new relationship "makesUseOf" between an entity in the logical model representing a "portType" and an entity in the physical model representing an XML document. Furthermore, one could create a classification of "importantThings" and associate it with a "port" entity in the logical model and with an entity in the physical model representing a "Policy" document. This enables semantic queries to target individual elements of the service metadata, and enables meaningful dependency analyses to take place prior to making changes.

The properties 312 may be name/value pairs that are associated with any of the Service Description Entities 302. Some properties are assigned by the system, such as the unique id, the owner, and the last time the service entity was changed. These system-assigned properties may not be changed. Others are derived through the "shredding" of a key-type service description document into its logical model. Properties of this type include name and namespace. Sometimes these system-assigned values are allowed to be changed and properties may be created. Such a user-defined property may be used as an unstructured and untyped extension mechanism. The properties 312 may be used in queries, and may be used to establish fine-grained access control.

The relationships 314 tie together one source service description entity to one or more target service description entities. Every relationship is given a name, and a source is only allowed to have a single relationship with a given name. Some relationships are assigned by the WSRR 10 during the "shredding" of key types of documents. The relationship established between XSD documents based on the importing of one into the other is one such system-assigned relationship. Relationships may also be user defined. For example, a user may: relate a concept that represents an external object to a service using a user defined relationship; relate all of the service description documents that will be governed as a unit to a governable entity; and/or relate a monitoring policy to a service endpoint.

A user may load classification 316 into the registry 12 where it may then be used to apply semantic meaning to service description entities 302. Classification systems are documents encoded using the Web Ontology Language (OWL). The registry represents OWL Classes as classifiers and interprets the subTypeOf relationship between those Classes as establishing a classifier hierarchy. Other OWL concepts such as data or relationship representing properties or other built-in OWL relationships may be ignored. A classification system is imported into the registry as a whole and updates may be made by importing a modified version of the ontology. Any class in the underlying ontology may be used as a classification; the same classification may be used to classify multiple entities, and an entity may be associated with multiple classifications.

Policy Editor

Figure 4:
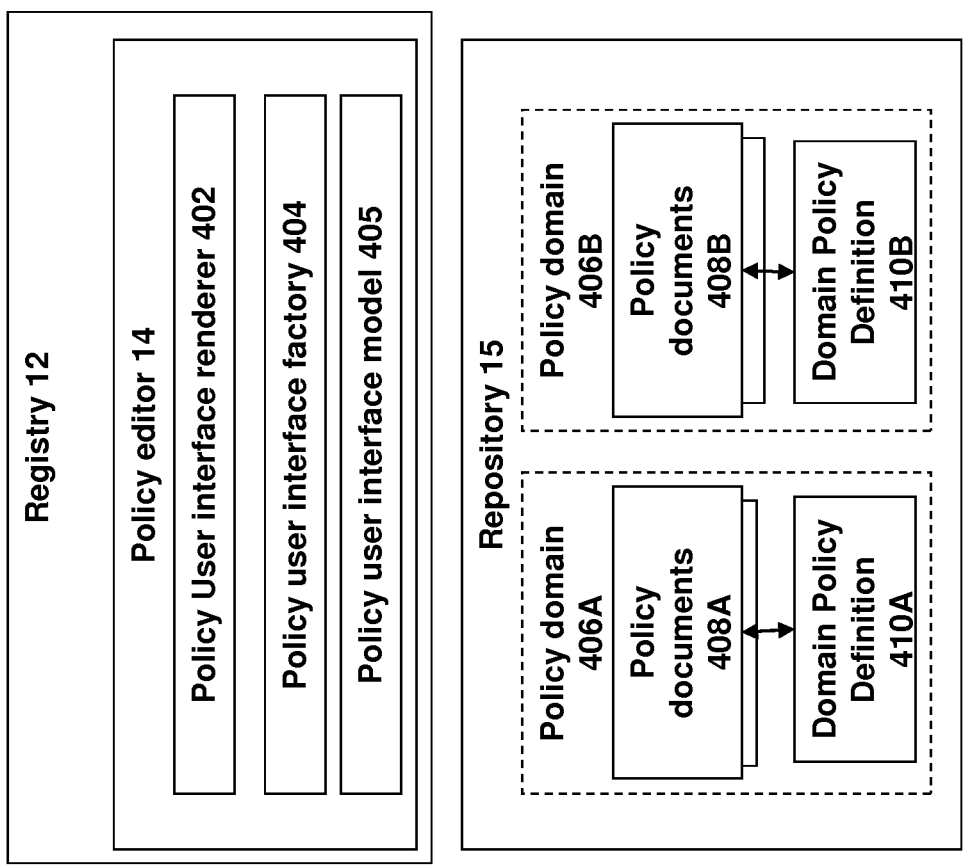
FIG. 4 is a schematic of an example of an implementation of the registry and repository of FIG. 2 according to an embodiment of the present subject matter.

FIG. 4 is a schematic of an example of an implementation of the registry and repository of FIG. 2. Referring to FIG. 4, the registry 12, the service document policy editor 14, and the repository 15 are illustrated. The policy editor 14 comprises: a policy user interface renderer 402; a policy user interface factory 404; and a policy user interface model 405. The repository 15 comprises; policy domains 406A and 406B; two sets of policy documents 408A and 408B; and domain policy definition 410A and 410B.

The policy user interface renderer 402 renders a policy document user interface 42 from a policy document user interface model 405 including user options for editing the details of the policy document.

The policy user interface factory 404 parses a policy document 408 (e.g., 408A, 408B) and an associated domain policy definition 410 (e.g., 410A, 410B) to create a policy user interface model 405 comprising the policy document details and user selectable options for creating, removing, updating, or deleting the details.

The policy domains 406 (e.g., 406A, 406B as shown by the dashed lines) are logical domains that group relevant policy documents 408 (e.g., 408A, 408B) and domain policy definitions 410 (e.g., 410A, 410B) together.

The domain policy definitions (410A and 410B) are XML documents that conform to an XML schema (XSD) for modelling types of policies, assertions, and properties that are defined in the WS-Policy specification. Each domain policy definition describes the structure of valid policy documents.

Figure 5:
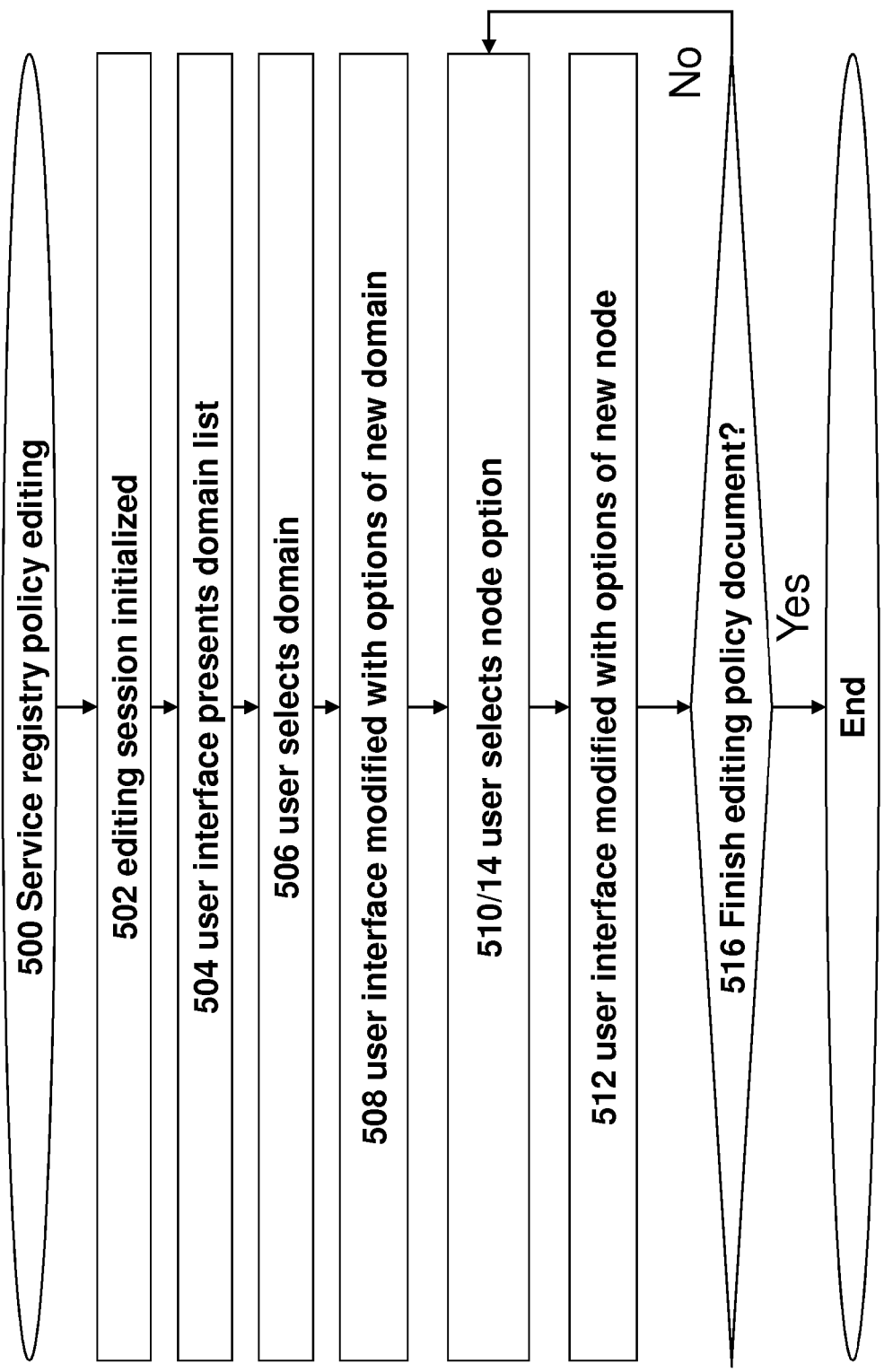
FIG. 5 is a schematic of an example of an implementation of a process of a policy editor according to an embodiment of the present subject matter.

FIG. 5 is a schematic of an example of an implementation of a process 500 of the document policy editor 14 according to the present subject matter.

In step 502, an editing session is initialized for a new policy document, the policy editor 14 initializes a policy user interface model 405 by reading domain policy definitions in order to find a list of supported domains.

In step 504, the policy user interface renderer 402 presents a list of policy domains options.

In step 506, the user selects a particular domain option (for example, in FIG. 7, the user has selected the "Multiple Supporting Token Policy"). In the preferred embodiment, the user 44 is using a client application allowing remote editing of the policy document. The client application sends a message to the policy editor 14 in the server to indicate the selection. The policy document and policy user interface model is updated to indicate the policy domain and a document node for that domain is created as a root node for the document.

In step 508, components for the new node are read in from the appropriate domain policy definition and a list of possible options is computed from these components. The components may include rules, assertions, properties, or further policies. The policy user interface model 405 is modified in order to only present the user with options that are relevant to the node in the domain policy definition. For example, the policy user interface model 405 is updated to reflect the possible actions as computed by the server code. In the example of FIG. 7, the interface model is updated to extend the node with user options of "Change Policy Type"; "Add Assertion"; "Add WS-Policy Element".

In step 510, the user selects one of the options that are permitted by the user interface. In the example of FIG. 7, "Add Assertion" is selected to the policy node and an assertion node (Signed Supporting Tokens) is added to the policy node.

In step 512, a request is made for a list of components for the new node in the policy document. The policy editor 14 consults the policy domain definition file in order to compile options for the new node and modify the user interface.

In step 514 (similar to step 510), the user selects an option for the policy node. In the example of FIG. 7, the user has added a "Signed Supporting Tokens" assertion to the "Multiple Supporting Token Policy". The user can make modifications to the assertion within the constraints of the controlling user interface, for instance to name the assertion.

In step 516, the user can add another node to an existing node by selecting a node option or the root of the policy document (step 514) or can finish editing the document. In the example of FIG. 7, the user has: added a "Supporting Tokens Policy" policy to the "Signed Supporting Tokens" assertion; and added to the root policy a "Signed Encrypted Supporting Tokens" assertion, a further "Supporting Tokens Policy" and an "Algorithm Suite" assertion.

In the preferred embodiment, each of these interactions is performed using AJAX (Asynchronous Javascript and XML) techniques to provide an improved user-experience and there is no whole "page refresh" that causes the screen to go blank and be redrawn.

EXAMPLE

Figure 6:
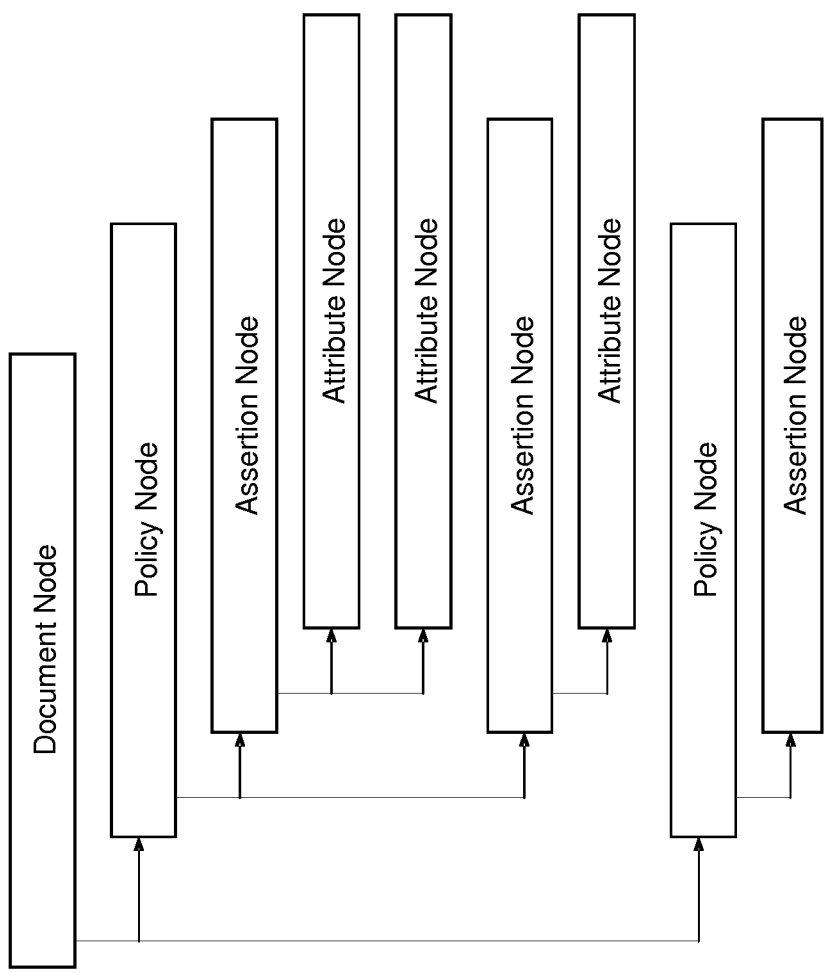
FIG. 6 is an example of an implementation of a node tree according to an embodiment of the present subject matter.

FIG. 6 is an example of an implementation of a node tree. Referring to FIG. 6, the policy model encapsulates an abstract syntax tree structure representation of the WS-Policy document that is being edited. The tree comprises various different types of nodes that define the WS-Policy document. As each node is created in the model in response to user actions, the policy domain definition files are used in order to help determine the structure and create any additional nodes that are required as a result of assertions or attributes being declared as mandatory in the definition file. For example, if an assertion of type 'EnsureSecurity' is declared in the definition file to also require a child assertion that specifies 'SecurityType' then when a user action to create a new 'EnsureSecurity' assertion is executed, the model will automatically realize that the child assertion is mandatory and thus also create that node in the tree. This information is reflected back to the user via the user-interface.

FIG. 7 is an example of an implementation of a WebSphere Service Registry and Repository screenshot. FIG. 7 shows a screenshot example view of the user-interface that has been implemented using this technology. The main panel contains two sections: the upper section that displays a table view of the current state of the model and currently selected element; and the lower section that contains the details of the currently selected row in the table. It should be noted that for each row in the table, only those actions that are applicable for the selected element are displayed, and this information is derived from the model that in turn is derived from the domain definition file. For example, there are no links to 'Add Assertion' or 'Add WS-Policy Element' for the 'Algorithm Suite' element in the upper section since the domain definition file of this example does not permit any new assertions to be added as children of this node. The same constraints are applied for attributes that may be added to assertions in the details section, therefore the user will only be allowed to add attributes according to what is specified in the domain definition file.

Figure 8:
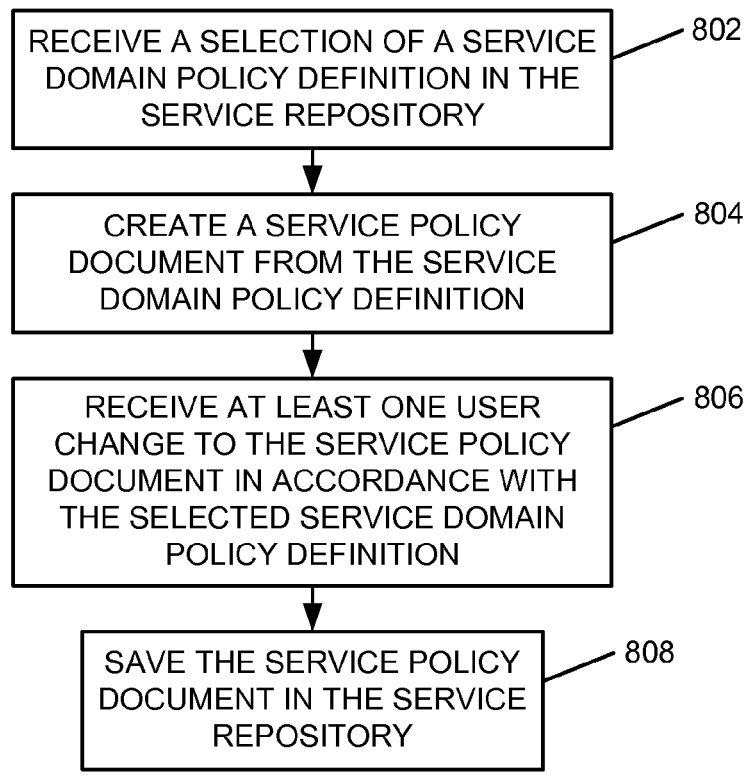
FIG. 8 is an example of an implementation of a process for a service registry policy editing user interface according to an embodiment of the present subject matter.

FIG. 8 is an example of an implementation of a process 800 for a service registry policy editing user interface. At step 802, the process 800 receives a selection of a service domain policy definition in the service repository. At step 804, the process 800 creates a service policy document from the service domain policy definition. At step 806, the process 800 receives at least one user change to the service policy document in accordance with the selected service domain policy definition. At step 808, the process 800 saves the service policy document in the service repository.

Figure 9:
FIG. 9 is an example of an implementation of a first additional process for a service registry policy editing user interface according to an embodiment of the present subject matter.

FIG. 9 is an example of an implementation of a first additional process 900 for a service registry policy editing user interface. At step 902, the process 900 presents a list of domain policy options to a user for selection.

Figure 10:
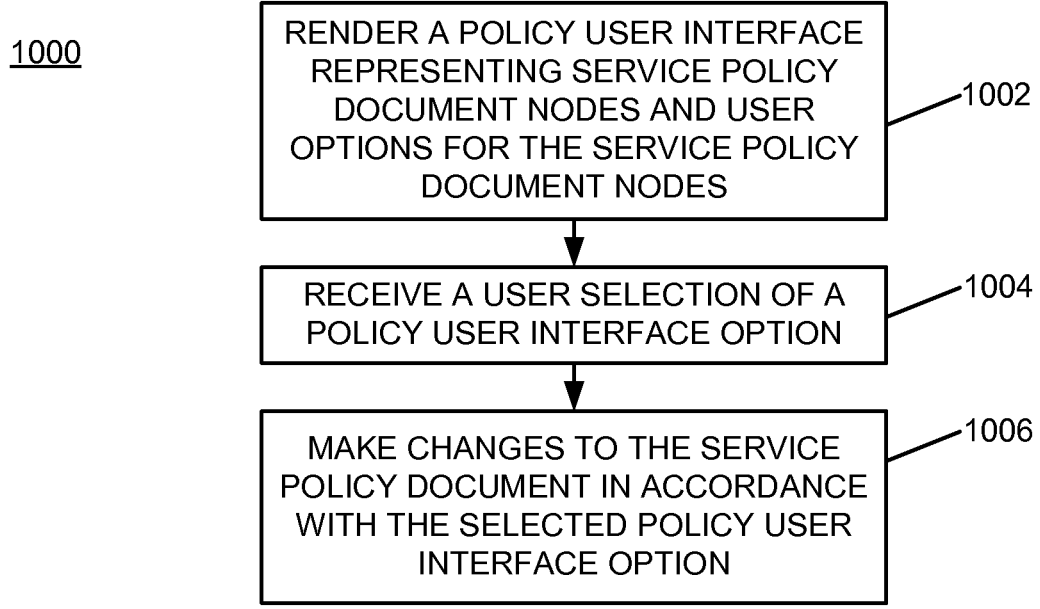
FIG. 10 is an example of an implementation of a second additional process for a service registry policy editing user interface according to an embodiment of the present subject matter.

FIG. 10 is an example of an implementation of a second additional process 1000 for a service registry policy editing user interface. At step 1002, the process 1000 renders a policy user interface representing service policy document nodes and user options for the service policy document nodes. At step 1004, the process 1000 receives a user selection of a policy user interface option. At step 1006, the process 1000 makes changes to the service policy document in accordance with the selected policy user interface option.

Figure 11:
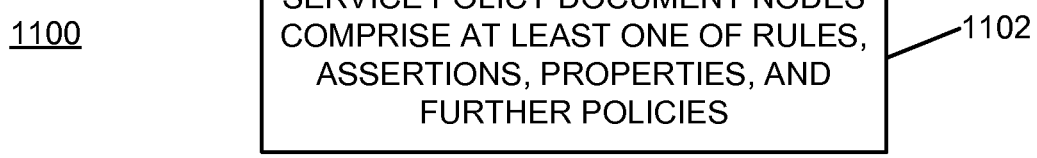
FIG. 11 is an example of an implementation of a third additional process for a service registry policy editing user interface according to an embodiment of the present subject matter.

FIG. 11 is an example of an implementation of a third additional process 1100 for a service registry policy editing user interface. At step 1102, the process 1100 includes service policy document nodes comprising at least one of rules, assertions, properties, and further policies.

Figure 12:
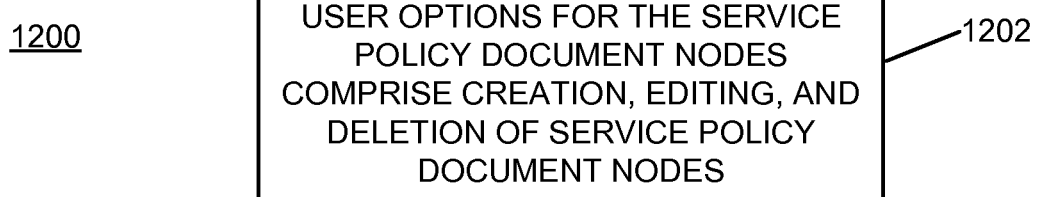
FIG. 12 is an example of an implementation of a fourth additional process for a service registry policy editing user interface according to an embodiment of the present subject matter.

FIG. 12 is an example of an implementation of a fourth additional process 1200 for a service registry policy editing user interface. At step 1202, the process 1200 includes user options for the service policy document nodes comprising creation, editing, and deletion of service policy document nodes.

Figure 13:
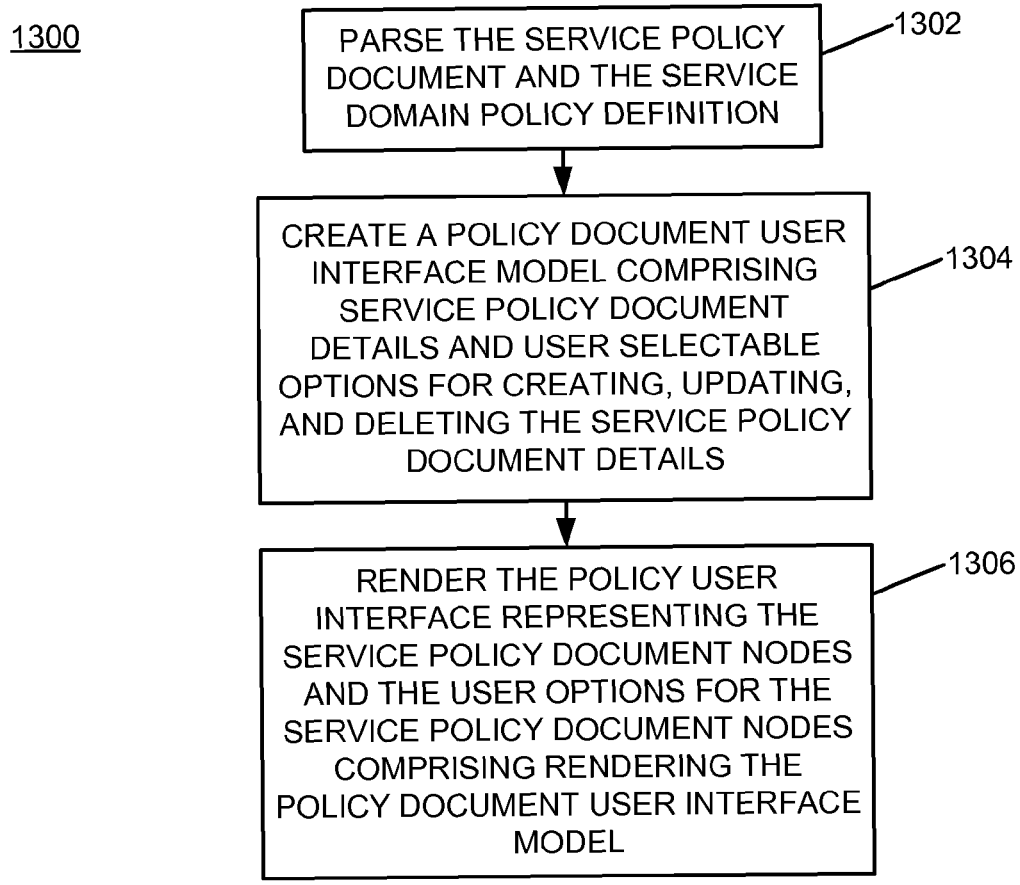
FIG. 13 is an example of an implementation of a fifth additional process for a service registry policy editing user interface according to an embodiment of the present subject matter.

FIG. 13 is an example of an implementation of a fifth additional process 1300 for a service registry policy editing user interface. At step 1302, the process 1300 parses the service policy document and the service domain policy definition. At step 1304, the process 1300 creates a policy document user interface model comprising service policy document details and user selectable options for creating, updating, and deleting the service policy document details. At step 1306, the process 1300 renders the policy user interface representing the service policy document nodes and the user options for the service policy document nodes comprising rendering the policy document user interface model.

Figure 14:
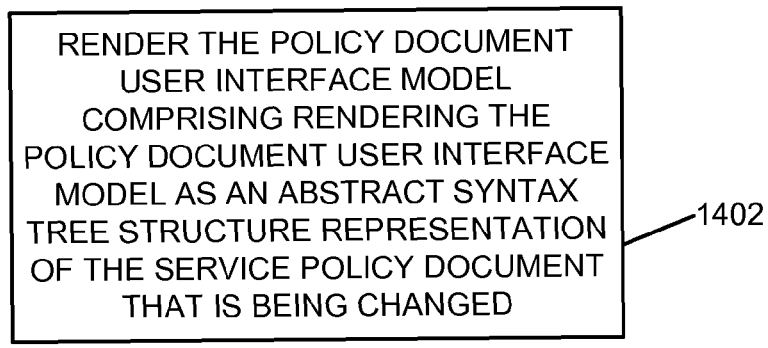
FIG. 14 is an example of an implementation of a sixth additional process for a service registry policy editing user interface according to an embodiment of the present subject matter.

FIG. 14 is an example of an implementation of a sixth additional process 1400 for a service registry policy editing user interface. At step 1402, the process 1400 renders the policy document user interface model comprising rendering the policy document user interface model as an abstract syntax tree structure representation of the service policy document that is being changed.

Other Embodiments

In another example embodiment, the policy editor 14 allows the policy document to be edited using a text editor. Changes to the policy document are validated against a domain policy definition and changes that are invalid are notified to the user.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components, or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed media or transmittable carrier media, respectively.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk, or the like. Channels for the storage and transmission of data may likewise comprise storage media of all descriptions as well as signal-carrying media, such as wired or wireless signal-carrying media, respectively.

The present invention may further suitably be embodied as a computer program product for use with a computer system. Such an implementation may comprise a series of computer-readable instructions either fixed on a tangible storage medium, such as a computer readable medium, for example, diskette, CD-ROM, ROM, or hard disk; or transmittable to a computer system, using a modem or other interface device, over either a tangible communication medium, including but not limited to optical or analogue communications lines, or intangibly using wireless communication techniques, including but not limited to microwave, infrared or other transmission techniques. The series of computer readable instructions embodies all or part of the functionality previously described herein.

Those skilled in the art will appreciate that such computer readable instructions may be written in a number of programming languages for use with many computer architectures or operating systems. Further, such instructions may be stored using any memory technology, present or future, including but not limited to, semiconductor, magnetic, or optical; or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk; or distributed from a server or electronic bulletin board over a network, for example, the Internet or World Wide Web.

In an alternative, the present subject matter may be realized in the form of a computer implemented method of deploying a service comprising steps of deploying computer program code operable to, when deployed into a computer infrastructure and executed thereon, cause the computer system to perform all the steps of the method.

In a further alternative, the present subject matter may be realized in the form of a data carrier having functional data thereon, said functional data comprising functional computer data structures to, when loaded into a computer system and operated upon thereby, enable said computer system to perform all the steps of the method.

It will be clear to one skilled in the art in view of the teachings above that many improvements and modifications may be made to the foregoing exemplary embodiment without departing from the scope of the present invention.

Abbreviations

J2EE Java™ 2 Platform Enterprise Edition
SCA Service Component Architecture
SOA Service oriented architecture.
WSDL Web Service Definition Language
WSRR IBM WebSphere Registry and Repository
XML extensible mark-up language
XSD XML Schema Definition Notices IBM and WebSphere are registered trademarks or trademarks of International Business Machines Corporation in the United States and/or other countries. Java and all Java-based trademarks are trademarks of Sun Microsystems, Inc. in the United States, other countries, or both. Eclipse is a trademark of Eclipse Foundation, Inc.

What is claimed is:

1. A method for operating a service registry and repository based on a triplestore database, comprising:
    receiving a selection of a service domain policy definition that specifies a supported service domain in the service repository, where the selected service domain policy definition specifies valid domain policy options applicable to elements of valid policy documents within the supported service domain;
    creating a service policy document structured from the valid domain policy options specified within the selected service domain policy definition;
    receiving at least one user change to an element of the service policy document derived from the valid domain policy options specified as applicable to the element in the selected service domain policy definition; and
    saving the changed service policy document in the service repository.

2. The method of claim 1, further comprising presenting a list of the valid domain policy options to a user for selection.

3. The method of claim 1, further comprising:
    rendering a policy user interface representing service policy document nodes and only the valid domain policy options relevant to the represented service policy document nodes as specified for the respective service policy document nodes in the selected service domain policy definition;
    receiving a user selection of a valid domain policy option; and
    making changes to the service policy document as specified in the selected service domain policy definition in response to receiving the user selection of the selected domain policy option.

4. The method of claim 3, where the service policy document nodes comprise at least one of rules, assertions, properties, and further policies.

5. The method of claim 3, where the valid domain policy options relevant to the represented service policy document nodes comprise creation, editing, and deletion of service policy document nodes.

6. The method of claim 3, further comprising:
- parsing the service policy document and the selected service domain policy definition;
- creating a policy document user interface model comprising service policy document details and valid user selectable domain policy options for creating, updating, and deleting the service policy document details as allowed by the service domain policy definition; and
- where rendering the policy user interface representing the service policy document nodes and only the valid domain policy options relevant to the represented service policy document nodes comprises rendering the policy document user interface model.

7. The method of claim 6, where rendering the policy document user interface model comprises rendering the policy document user interface model as an abstract syntax tree structure representation of the service policy document that is being changed.

8. A service registry and repository system based on a triplestore database comprising:
- at least one processor programmed to:
  - receive a selection of a service domain policy definition that specifies a supported service domain in the service repository, where the selected service domain policy definition specifies valid domain policy options applicable to elements of valid policy documents within the supported service domain;
  - create a service policy document structured from the valid domain policy options specified within the selected service domain policy definition;
  - receive at least one user change to an element of the service policy document derived from the valid domain policy options specified as applicable to the element in the selected service domain policy definition; and
  - save the changed service policy document in the service repository.

9. The system of claim 8, where the processor is further programmed to present a list of the valid domain policy options to a user for selection.

10. The system of claim 8, where the processor is further programmed to:
- render a policy user interface representing service policy document nodes and only the valid domain policy options relevant to the represented service policy document nodes as specified for the respective service policy document nodes in the selected service domain policy definition;
- receive a user selection of a valid domain policy option; and
- make changes to the service policy document as specified in the selected service domain policy definition in response to receiving the user selection of the selected domain policy option.

11. The system of claim 10, where the service policy document nodes comprise at least one of rules, assertions, properties, and further policies.

12. The system of claim 10, where the valid domain policy options relevant to the represented service policy document nodes comprise creation, editing, and deletion of service policy document nodes.

13. The system of claim 10, where the processor is further programmed to:
- parse the service policy document and the selected service domain policy definition;
- create a policy document user interface model comprising service policy document details and valid user selectable domain policy options for creating, updating, and deleting the service policy document details as allowed by the service domain policy definition; and
- where, in being programmed to render the policy user interface representing the service policy document nodes and only the valid domain policy options relevant to the represented service policy document nodes, the processor is programmed to render the policy document user interface model.

14. The system of claim 13, where, in being programmed to render the policy document user interface model, the processor is programmed to render the policy document user interface model as an abstract syntax tree structure representation of the service policy document that is being changed.

15. A computer program product comprising a non-transitory computer readable recording medium having computer readable code stored thereon for a service registry and repository based on a triplestore database, where the computer readable code when executed on a computer causes the computer to:
- receive a selection of a service domain policy definition that specifies a supported service domain in the service repository, where the selected service domain policy definition specifies valid domain policy options applicable to elements of valid policy documents within the supported service domain;
- create a service policy document structured from the valid domain policy options specified within the selected service domain policy definition;
- receive at least one user change to an element of the service policy document derived from the valid domain policy options specified as applicable to the element in the selected service domain policy definition; and
- save the changed service policy document in the service repository.

16. The computer program product of claim 15, where the computer readable code when executed on the computer further causes the computer to present a list of the valid domain policy options to a user for selection.

17. The computer program product of claim 15, where the computer readable code when executed on the computer further causes the computer to:
- render a policy user interface representing service policy document nodes and only the valid domain policy options relevant to the represented service policy document nodes as specified for the respective service policy document nodes in the selected service domain policy definition;
- receive a user selection of a valid domain policy option; and
- make changes to the service policy document as specified in the selected service domain policy definition in response to receiving the user selection of the selected domain policy option.

18. The computer program product of claim 17, where the service policy document nodes comprise at least one of rules, assertions, properties, and further policies.

19. The computer program product of claim 17, where the valid domain policy options relevant to the represented service policy document nodes comprise creation, editing, and deletion of service policy document nodes.

20. The computer program product of claim 17, where the computer readable code when executed on the computer further causes the computer to:
- parse the service policy document and the selected service domain policy definition;
- create a policy document user interface model comprising service policy document details and valid user selectable domain policy options for creating, updating, and deleting the service policy document details as allowed by the service domain policy definition; and
- where, in causing the computer to render the policy user interface representing the service policy document nodes and only the valid domain policy options relevant to the represented service policy document nodes, the computer readable code when executed on the computer further causes the computer to render the policy document user interface model.

21. The computer program product of claim 20, where, in causing the computer to render the policy document user interface model, the computer readable code when executed on the computer further causes the computer to render the policy document user interface model as an abstract syntax tree structure representation of the service policy document that is being changed.

* * * * *